(12) United States Patent
Ahn (10) Patent No.: US 11,052,951 B2
(45) Date of Patent: Jul. 6, 2021

(54) DEVICE FOR REINFORCING VEHICLE BODY

(71) Applicants: Hyundai Motor Company, Seoul (KR); Kia Motors Corporation, Seoul (KR)

(72) Inventor: Do Hwan Ahn, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 115 days.

(21) Appl. No.: 16/562,572

(22) Filed: Sep. 6, 2019

(65) Prior Publication Data

US 2020/0361537 A1 Nov. 19, 2020

(30) Foreign Application Priority Data

May 13, 2019 (KR) .................. 10-2019-0055462

(51) Int. Cl.
*B60J 7/00* (2006.01)
*B62D 25/08* (2006.01)
*B62D 25/20* (2006.01)

(52) U.S. Cl.
CPC ......... *B62D 25/08* (2013.01); *B62D 25/2018* (2013.01); *B62D 25/2036* (2013.01)

(58) Field of Classification Search
CPC ........ F17C 2201/0152; F17C 2201/052; F17C 2203/012; F17C 2203/0646; F17C 2209/221; B61D 3/20; B61D 45/007; B61F 1/00; G02B 6/3897; C04B 38/0006
See application file for complete search history.

(56) References Cited

U.S. PATENT DOCUMENTS

| 5,466,033 | A | | 11/1995 | Murakami et al. | |
|---|---|---|---|---|---|
| 5,800,007 | A | * | 9/1998 | Cho | B62D 25/04 296/146.6 |
| 9,365,242 | B1 | * | 6/2016 | Yang | B62D 21/157 |
| 9,394,006 | B2 | * | 7/2016 | Sakuragi | B62D 25/04 |
| 9,457,844 | B2 | * | 10/2016 | Yoshida | B62D 25/04 |
| 9,487,239 | B2 | * | 11/2016 | Schnug | B62D 25/025 |
| 9,744,998 | B2 | * | 8/2017 | Inamoto | B62D 25/025 |
| 9,802,651 | B2 | * | 10/2017 | Miranda | B62D 25/02 |
| 9,828,034 | B2 | * | 11/2017 | Gazes | B62D 25/04 |
| 9,849,916 | B2 | * | 12/2017 | Valencia Carrio | B60R 19/18 |
| 10,053,152 | B2 | * | 8/2018 | Kellner | B62D 21/15 |
| 10,059,376 | B2 | * | 8/2018 | Heitkamp | B62D 29/008 |
| 10,118,254 | B2 | * | 11/2018 | Sakai | B62D 25/025 |
| 10,442,467 | B2 | * | 10/2019 | Sato | B62D 21/157 |

(Continued)

FOREIGN PATENT DOCUMENTS

| JP | H051668 U | 1/1993 |
|---|---|---|
| JP | H05319308 A | 12/1993 |

(Continued)

*Primary Examiner* — Kiran B Patel
(74) *Attorney, Agent, or Firm* — Slater Matsil, LLP (57) ABSTRACT

A device can be used for reinforcing a vehicle body, which includes a front side inner panel and a side outer reinforce complement assembled to the front side inner panel. The device includes a bulkhead section formed in a closed space between the front side inner panel and the side outer reinforce complement. The front side inner panel and the side outer reinforce complement are cross-linked to each other by the bulkhead section.

20 Claims, 6 Drawing Sheets

(56) References Cited

U.S. PATENT DOCUMENTS

| | | | | |
|---|---|---|---|---|
| 10,745,059 B2* | 8/2020 | Yamazaki | ............ | B62D 21/157 |
| 10,814,915 B2* | 10/2020 | Onishi | ................... | B62D 25/04 |
| 2002/0033618 A1* | 3/2002 | Kwon | ................ | B62D 29/002 |
| | | | | 296/203.03 |
| 2002/0063445 A1 | 5/2002 | Takeuchi | | |
| 2003/0006629 A1* | 1/2003 | Kimura | ................. | B60K 15/05 |
| | | | | 296/203.03 |
| 2009/0108577 A1* | 4/2009 | Hirotani | ............. | B60R 22/1951 |
| | | | | 280/802 |
| 2010/0244492 A1* | 9/2010 | Itakura | ................... | B62D 25/04 |
| | | | | 296/193.06 |
| 2010/0270830 A1* | 10/2010 | Maruyama | ........... | B62D 25/025 |
| | | | | 296/209 |
| 2012/0119477 A1* | 5/2012 | Kim | ....................... | B60R 22/24 |
| | | | | 280/801.2 |
| 2012/0313400 A1* | 12/2012 | Balzer | ................... | B62D 25/04 |
| | | | | 296/193.06 |
| 2014/0028056 A1* | 1/2014 | Nishimura | ............. | B62D 25/04 |
| | | | | 296/193.06 |
| 2014/0054927 A1* | 2/2014 | Nakamura | ........... | B62D 25/04 |
| | | | | 296/193.06 |
| 2014/0084633 A1* | 3/2014 | Matsuda | ................ | B62D 25/02 |
| | | | | 296/203.01 |
| 2014/0117705 A1* | 5/2014 | Tamaki | .................. | B60J 5/0458 |
| | | | | 296/146.6 |
| 2014/0232138 A1* | 8/2014 | Kanaguichi | ........... | B62D 25/04 |
| | | | | 296/187.12 |
| 2014/0319869 A1* | 10/2014 | Baskar | ................... | B60J 5/0451 |
| | | | | 296/146.6 |
| 2015/0298634 A1* | 10/2015 | Hara | ....................... | B60R 19/24 |
| | | | | 293/133 |
| 2015/0344071 A1* | 12/2015 | Nakano | .................. | B62D 25/04 |
| | | | | 296/187.09 |
| 2016/0052552 A1* | 2/2016 | Yamamoto | ........... | B62D 21/152 |
| | | | | 296/187.1 |
| 2016/0082814 A1* | 3/2016 | Mori | ...................... | B62D 25/04 |
| | | | | 296/146.11 |
| 2016/0083015 A1* | 3/2016 | Kiyoshita | .............. | B62D 25/04 |
| | | | | 296/187.09 |
| 2016/0194032 A1* | 7/2016 | Yamamoto | ........... | B62D 25/025 |
| | | | | 296/193.05 |
| 2016/0229456 A1* | 8/2016 | Boettcher | ............ | B62D 27/026 |
| 2016/0368441 A1 | 12/2016 | An | | |
| 2017/0036701 A1* | 2/2017 | Yamada | ................. | B62D 25/04 |
| 2017/0080978 A1* | 3/2017 | Yoshida | ............. | B62D 25/2036 |
| 2017/0203792 A1* | 7/2017 | Sunohara | ............. | B62D 21/157 |
| 2017/0274936 A1* | 9/2017 | Ishii | ..................... | B62D 25/025 |
| 2018/0099698 A1* | 4/2018 | Toyota | ................... | B62D 25/02 |
| 2019/0039658 A1* | 2/2019 | Yokoi | ..................... | B62D 25/06 |
| 2019/0168815 A1* | 6/2019 | Wada | ................... | B62D 27/023 |
| 2019/0168823 A1* | 6/2019 | Nakamoto | ............. | B62D 27/02 |
| 2019/0233019 A1* | 8/2019 | Walch | .................. | B62D 21/157 |
| 2019/0248420 A1* | 8/2019 | Caliskan | ................ | B60R 22/18 |
| 2019/0283805 A1* | 9/2019 | Kurokawa | ........... | B62D 29/043 |
| 2019/0300073 A1* | 10/2019 | Suzumura | ........... | B62D 29/005 |
| 2019/0344830 A1* | 11/2019 | Muraoka | .................. | B60K 1/04 |
| 2019/0389285 A1* | 12/2019 | Horita | .................... | B60J 5/0444 |
| 2020/0102016 A1* | 4/2020 | Hoshuyama | ........... | B62D 25/04 |
| 2020/0223490 A1* | 7/2020 | Min | ..................... | B62D 25/025 |
| 2020/0307695 A1* | 10/2020 | Tanaka | .................. | B62D 25/20 |

FOREIGN PATENT DOCUMENTS

| | | |
|---|---|---|
| JP | 2002154458 A | 5/2002 |
| KR | 19990074230 A | 10/1999 |

* cited by examiner

[B-B SECTION]

FIG. 7

DEVICE FOR REINFORCING VEHICLE BODY

CROSS-REFERENCE TO RELATED APPLICATIONS

This application claims priority to Korean Patent Application No. 10-2019-0055462, filed on May 13, 2019, which application is hereby incorporated herein by reference.

TECHNICAL FIELD

The present disclosure relates to a device for reinforcing a vehicle body.

BACKGROUND

Figure 1:
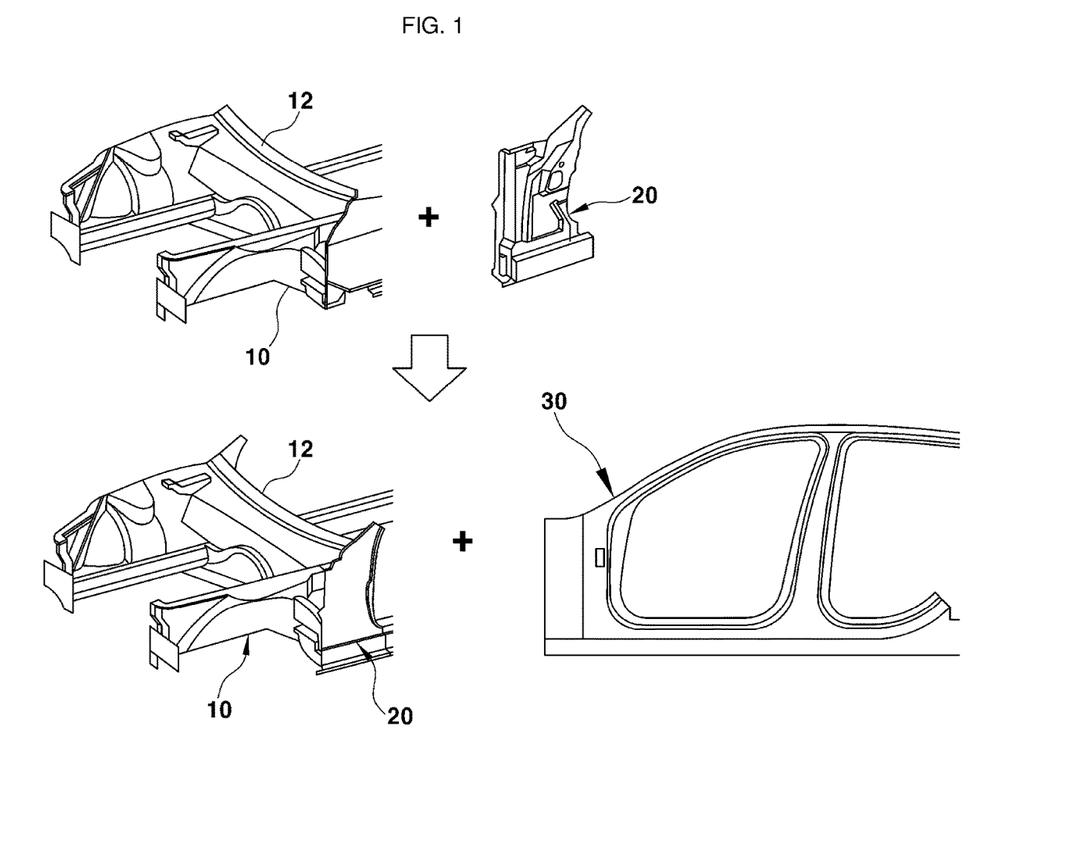
FIG. 1 is a schematic view illustrating a vehicle body assembly process for a conventional front side part.

In the inline assembling the body of a vehicle, the process of assembling the front side part of the vehicle body proceeds in the following order: assembling a front side inner panel 20 to the side of a floor compliance 10 including a dash panel 12, and then assembling a side outer reinforce complement 30 to the outer surface of the front side inner panel 20, as illustrated in FIG. 1.

Figure 2:
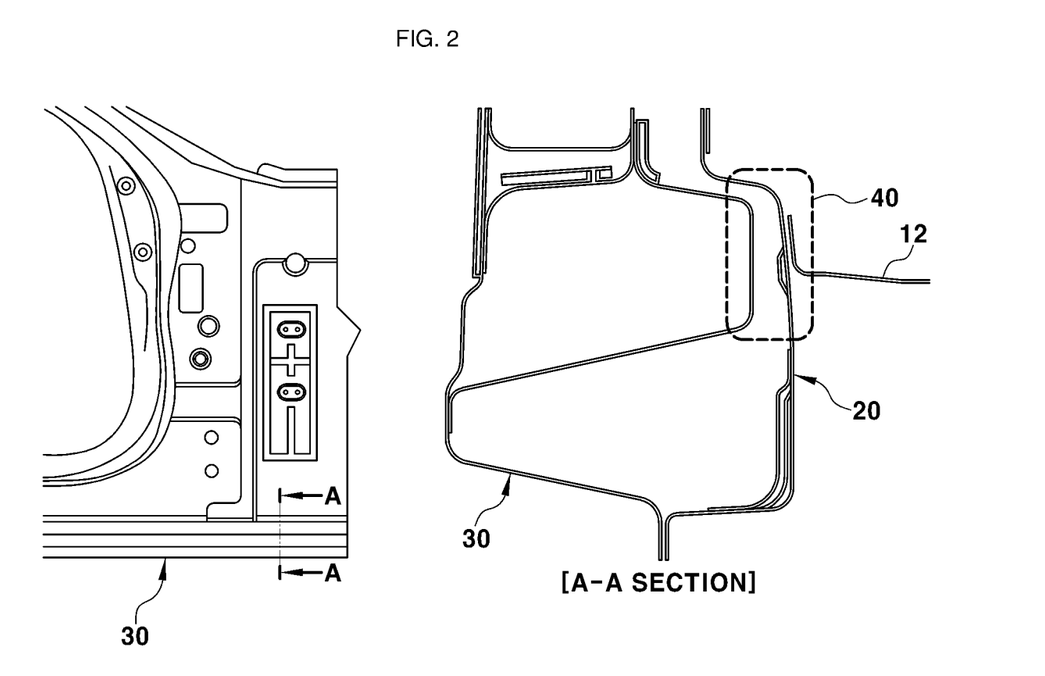
FIG. 2 is a cross-sectional view illustrating a vehicle body coupling structure for the conventional front side part.

The front side part of the vehicle body assembled in this order has a cross-sectional structure as illustrated in FIG. 2.

As illustrated in FIG. 2, the side outer reinforce complement 30 is assembled to the front side inner panel 20. However, an uncoupled portion 40 in which the front side inner panel 20 and the side outer reinforce complement 30 are not coupled to each other but are spaced apart from each other is present in a closed space as the internal portion between the front side inner panel 20 and the side outer reinforce complement 30.

In addition, since the internal portion between the front side inner panel 20 and the side outer reinforce complement 30 forms a closed section, it is impossible for a means (for example, a welding gun) for coupling the uncoupled portion 40 to enter the internal portion. As a result, the uncoupled portion 40 remains between the front side inner panel 20 and the side outer reinforce complement 30.

Hence, in the event of a vehicle side collision (especially, small overlap collision), the closed portion between the front side inner panel 20 and the side outer reinforce complement 30, namely, the uncoupled portion 40 may be torn without being deformed for shock absorption.

Moreover, since the uncoupled portion 40 is torn without deformation, shocks may not be smoothly absorbed in the event of a collision.

For reference, the small overlap collision means that the vehicle does not collide head-on with an object to be collided and the object to be collided collides with either the left or right of the vehicle.

Figure 3:
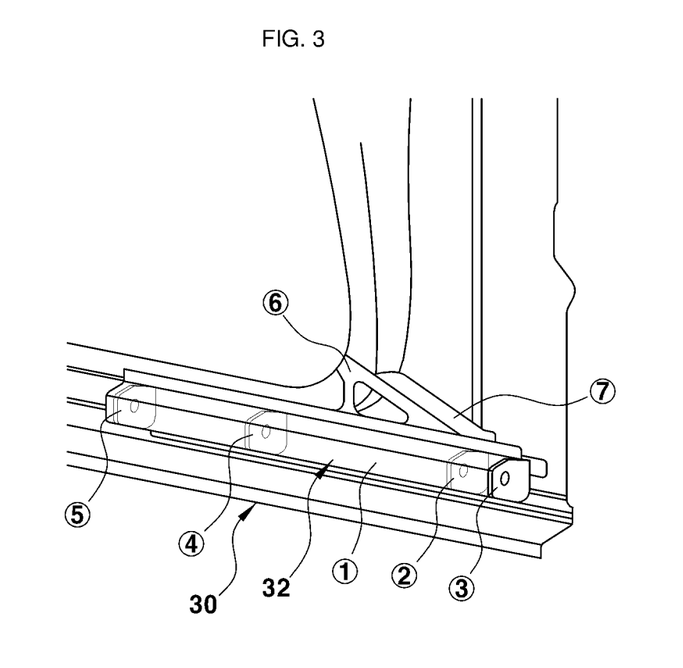
FIG. 3 is a schematic view illustrating an example in which a plurality of reinforcing members is mounted on a side outer reinforce complement among the components of the conventional front side part.

Accordingly, in preparation for the vehicle side collision (especially, small overlap collision), a reinforcing member 32 composed of a combination of a large number of reinforcing parts (for example, parts ① to ⑦) is intensively mounted on the inner surface of the side outer reinforce complement 30.

Although the reinforcing member 32 mounted on the inner surface of the side outer reinforce complement 30 may absorb impact energy due to the collision, issues such as an increase in the number of parts, an increase in weight, and an increase in the number of assembly processes may be caused since the reinforcing member 32 is composed of a combination of a large number of parts.

The above information disclosed in this Background section is only for enhancement of understanding of the background of the disclosure and therefore it may contain information that does not form the prior art that is already known in this country to a person of ordinary skill in the art.

SUMMARY

The present disclosure relates to a device for reinforcing a vehicle body. In particular embodiments, the present disclosure relates to a device for reinforcing a vehicle body, which is capable of enhancing coupling rigidity of a front side part from among components of a body of a vehicle.

Embodiments of the present disclosure can solve problems associated with prior art.

In an aspect, the present disclosure provides a device for reinforcing a vehicle body, which enables a front side inner panel and a side outer reinforce complement constituting a front side part of a vehicle to be cross-linked using a bulkhead, thereby allowing the bulkhead coupling section to prevent the front side inner panel and the side outer reinforce complement from tearing and simultaneously to absorb shocks in the event of a side collision of the vehicle and reducing the number of parts for reinforcing rigidity compared with a conventional structure.

In a preferred embodiment, a device for reinforcing a vehicle body includes a front side inner panel and a side outer reinforce complement assembled to the front side inner panel, which includes a bulkhead section formed in a closed space between the front side inner panel and the side outer reinforce complement. The front side inner panel and the side outer reinforce complement are cross-linked to each other by the bulkhead section.

The bulkhead section may include a first bulkhead mounted on an outer surface of the front side inner panel, and a second bulkhead mounted on an inner surface of the side outer reinforce complement so as to be cross-linked to the first bulkhead.

The first bulkhead may have a "⊏" cross-sectional structure in which it has a plurality of cross-linking holes formed in the front portion thereof, and the second bulkhead may be provided in the form of a square pillar inserted into the cross-linking holes of the first bulkhead.

The first bulkhead may have first mounting ends extending from its upper and lower edges, the first mounting ends being pressed against and welded to the outer surface of the front side inner panel.

The second bulkhead may have second mounting ends extending from its four edges, the second mounting ends being pressed against and welded to the inner surface of the side outer reinforce complement.

The second bulkhead may be provided in the form of a square pillar having a gradually decreasing cross-sectional area in an inward direction.

The second bulkhead may act as a resistance element when the front side inner panel is deformed by an occurrence of collision in a state in which the second bulkhead is inserted into a cross-linking hole of the first bulkhead.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION OF ILLUSTRATIVE EMBODIMENTS

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 4:
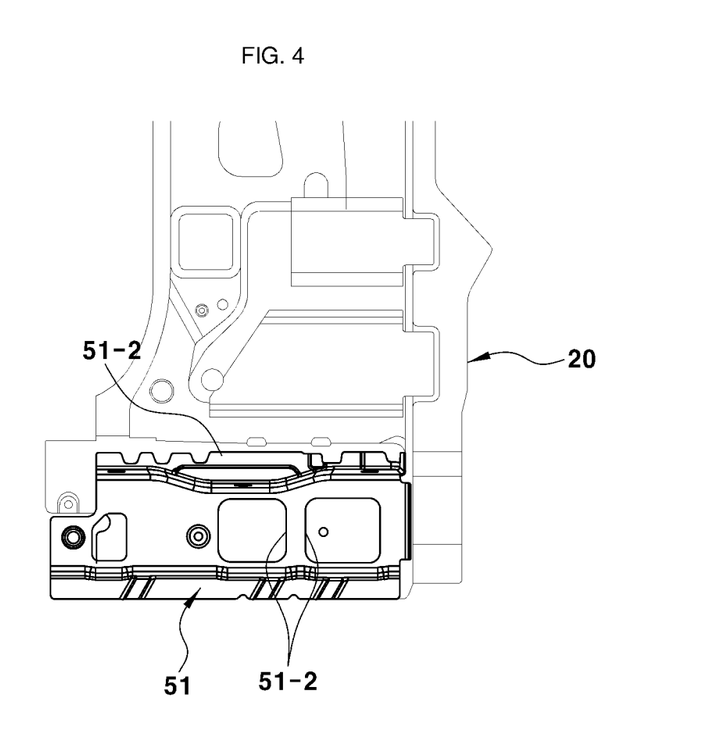
FIG. 4 is a side view illustrating a first bulkhead being mounted to a front side inner panel in a device for reinforcing a vehicle body according to the present disclosure.
Figure 5:
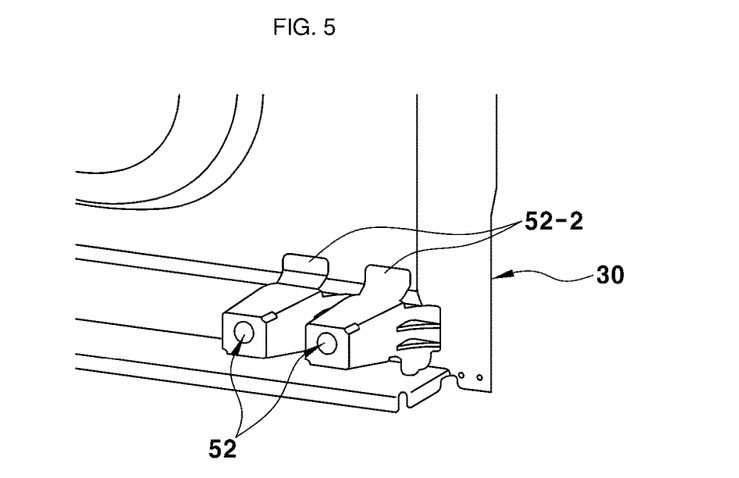
FIG. 5 is a perspective view illustrating a second bulkhead being mounted to a side outer reinforce complement in the device for reinforcing a vehicle body according to the present disclosure.

FIG. 4 illustrates that a first bulkhead is mounted to a front side inner panel in a device for reinforcing a vehicle body according to the present disclosure. FIG. 5 illustrates that a second bulkhead is mounted to a side outer reinforce complement in the device for reinforcing a vehicle body according to the present disclosure.

The present disclosure is characterized in that a front side inner panel 20 and a side outer reinforce complement 30 are cross-linked to each other by a bulkhead section 50 including a first bulkhead 51 and a second bulkhead 52 in a closed space between the outer surface of the front side inner panel 20 and the inner surface of the side outer reinforce complement 30.

As described above, in the inline assembling the body of the vehicle, the process of assembling the front side part of the vehicle body proceeds in the following order: assembling a front side inner panel to the side of a floor compliance including a dash panel; and then assembling a side outer reinforce complement to the outer surface of the front side inner panel.

After this assembly process, the closed space is defined between the front side inner panel and the side outer reinforce complement, and the front side inner panel and the side outer reinforce complement are not coupled to each other but are spaced apart from each other in the closed space.

In consideration of this point, the present disclosure allows the front side inner panel 20 and the side outer reinforce complement 30 to be cross-linked to each other by the bulkhead section 50 in the closed space, in order to increase the coupling rigidity between the front side inner panel 20 and the side outer reinforce complement 30.

To this end, the bulkhead section 50 includes a first bulkhead 51 mounted on the outer surface of the front side inner panel 20 and a second bulkhead 52 mounted on the inner surface of the side outer reinforce complement 30 so as to be cross-linked to the first bulkhead 51.

The first bulkhead 51 has a "⊏" cross-sectional structure in which it has a plurality of cross-linking holes 51-1 formed in the front portion thereof, as illustrated in FIG. 4. The first bulkhead 51 is longitudinally arranged on the outer surface of the front side inner panel 20 and mounted thereto by welding or the like.

In this case, the first bulkhead 51 has first mounting ends 51-2 formed at the upper and lower edges thereof and the first mounting ends 51-2 are pressed against the outer surface of the front side inner panel 20. The first mounting ends 51-2 are portions welded to the front side inner panel 20.

Preferably, the front portion of the first bulkhead 51 is formed with two cross-linking holes 51-1 in the form of a square, and the cross-linking holes 51-1 are arranged side by side in the forward and rearward direction of the vehicle body.

As illustrated in FIG. 5, the second bulkhead 52 is provided in the form of a pair of square pillars insertable into the respective cross-linking holes 51-1 of the first bulkhead 51.

In this case, the second bulkhead 52 has second mounting ends 52-2 extending from the four edges thereof and the second mounting ends 52-2 are pressed against and welded to the inner surface of the side outer reinforce complement 30. The second mounting ends 52-2 are portions welded to the side outer reinforce complement 30.

Accordingly, in the process of assembling the front side part of the vehicle body, when the front side inner panel 20 to which the first bulkhead 51 is mounted is assembled to the side of the floor compliance including the dash panel and the side outer reinforce complement 30 to which the second bulkhead 52 is mounted is then assembled to the front side inner panel 20, the second bulkhead 52 is inserted and fastened into the cross-linking holes 51-1 of the first bulkhead 51.

Preferably, the second bulkhead 52 is provided in the form of a square pillar having a gradually decreasing cross-sectional area in an inward direction, namely, in a direction in which it is inserted into the cross-linking holes 51-1. The reason for this is that the closed width between the front side inner panel 20 and the side outer reinforce complement 30 differs for each type of a vehicle so that the length of the second bulkhead 52 inserted into the cross-linking holes 51-1 is adjusted differently.

Another reason why the second bulkhead 52 is provided in the form of a square pillar having a gradually decreasing cross-sectional area is that the tip of the second bulkhead 52 does not contact with the inner surface of the front side inner panel 20 by limiting the maximum insertion length of the second bulkhead 52 inserted into the cross-linking holes 51-1.

In more detail, the second bulkhead 52 is inserted into the cross-linking holes 51-1 of the first bulkhead 51 such that its small cross-sectional area portion relative to the cross-linking holes 51-1 is easily inserted and its larger cross-sectional area portion is not inserted any more, thereby preventing the tip of the second bulkhead 52 from contacting with the inner surface of the front side inner panel 20. Therefore, it is possible to easily prevent the front side inner panel 20 from being damaged due to the impact when the tip of the second bulkhead 52 contacts with the inner surface of the front side inner panel 20.

Figure 6:
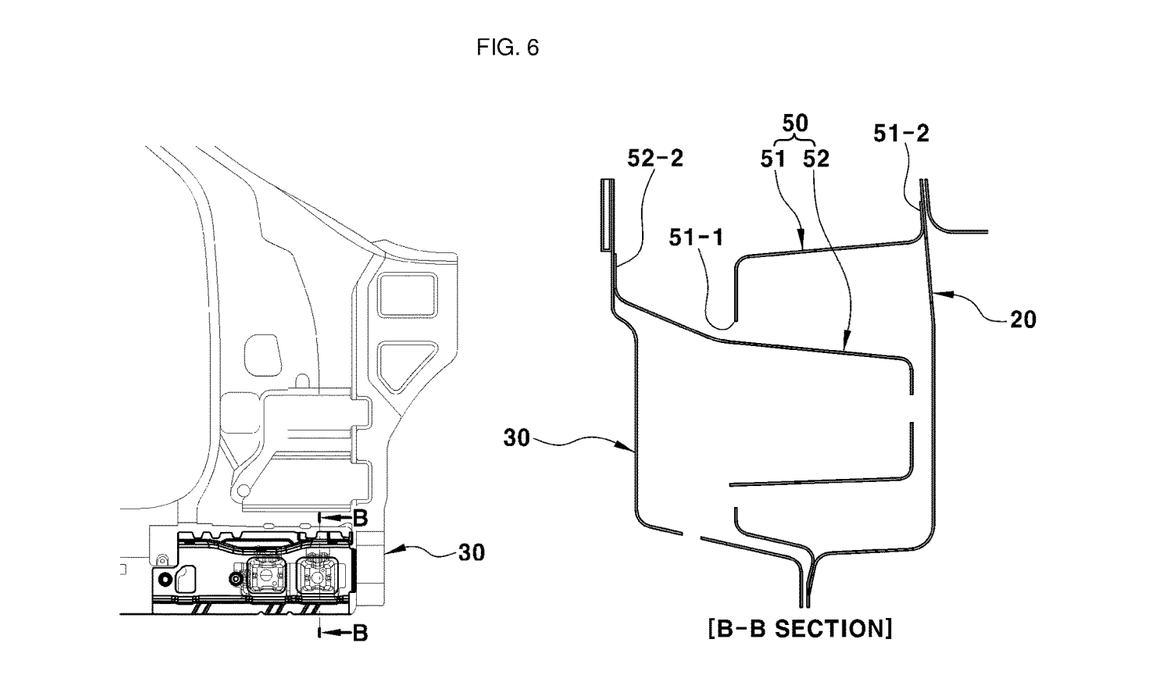
FIGS. 6 and 7 are cross-sectional views illustrating the first bulkhead and the second bulkhead cross-linked to each other in the device for reinforcing a vehicle body according to the present disclosure.
Figure 7:
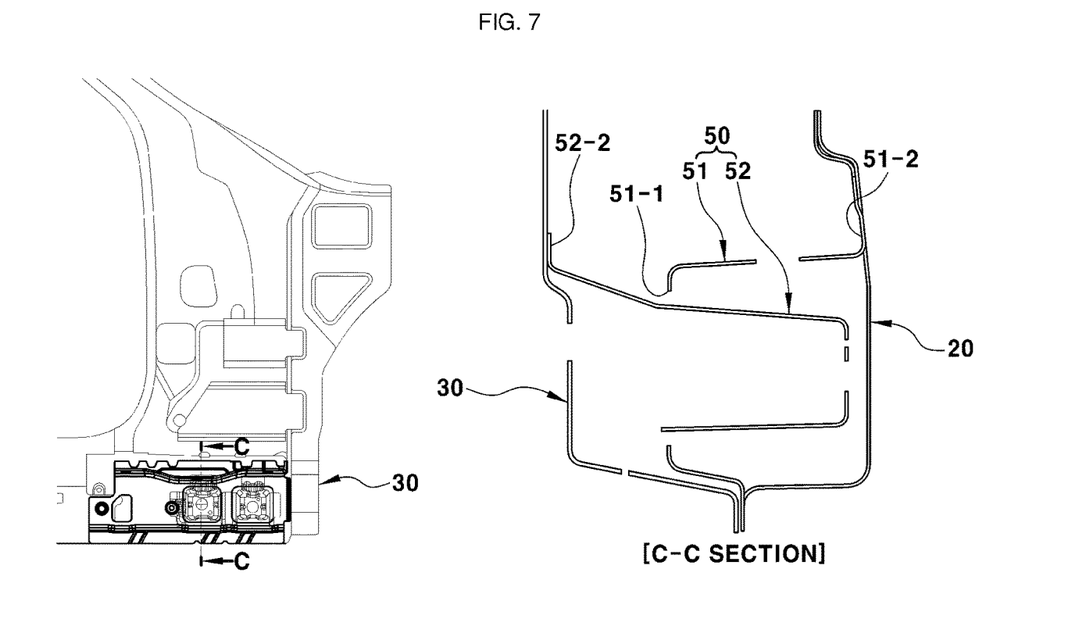

Meanwhile, when the side outer reinforce complement 30 to which the second bulkhead 52 is mounted is assembled to the front side inner panel 20 to which the first bulkhead 51 is mounted, one of a pair of second bulkheads 52 is inserted into one of two cross-linking holes 51-1 formed in the front portion of the first bulkhead 51 as illustrated in FIG. 6, and the other one of the pair of second bulkheads 52 is inserted into the other one of the two cross-linking holes 51-1 formed in the front portion of the first bulkhead 51 as illustrated in FIG. 7. Thus, the first bulkhead 51 and the second bulkhead 52 are in a double-coupled state.

Accordingly, since the front side inner panel 20 and the side outer reinforce complement 30 constituting the front side part of the vehicle body are cross-linked to each other by the bulkhead section 50 including the first and second bulkheads 51 and 52 even in the closed space between the front side inner panel 20 and the side outer reinforce complement 30, it is possible to increase the coupling rigidity between the front side inner panel 20 and the side outer reinforce complement 30.

In particular, since the bulkhead section 50 is deformed while absorbing shocks when the front side inner panel 20 or the like is deformed in the event of the side collision of the vehicle (especially, small overlap collision) and acts as a resistance element against the tearing of the double-coupled portion between the first bulkhead 51 and the second bulkhead 52, it is possible to prevent the front side inner panel 20, the side outer reinforce complement 30, and the like from tearing. Thus, the front side inner panel 20, the side outer reinforce complement 30, and the like are deformed without tearing due to the impact, thereby smoothly absorbing shocks in the event of the collision.

In addition, unlike the conventional method in which the reinforcing member 32 composed of seven or more parts is intensively mounted on the inner surface of the side outer reinforce complement 30, the present disclosure applies the bulkhead section 50 composed of three parts. Therefore, it is possible to provide advantages such as a reduction in the number of parts, a reduction in weight, and a reduction in the number of assembly processes.

The present disclosure provides the following effects through the above-mentioned description.

First, since the front side inner panel and the side outer reinforce complement constituting the front side part of the vehicle body are cross-linked to each other by the bulkhead in the closed space between the front side inner panel and the side outer reinforce complement, it is possible to increase the coupling rigidity between the front side inner panel and the side outer reinforce complement.

Second, since the bulkhead section acts as a resistance element while absorbing shocks when the front side inner panel or the like is deformed in the event of the side collision of the vehicle (especially, small overlap collision), it is possible to prevent the front side inner panel, the side outer reinforce complement, and the like from tearing.

Third, since it is possible to prevent the front side inner panel, the side outer reinforce complement, and the like from tearing in spite of impact caused by the collision, the front side inner panel, the side outer reinforce complement, and the like can be easily deformed and absorb shocks.

Fourth, unlike the conventional method in which the reinforcing member composed of seven or more parts is intensively mounted on the inner surface of the side outer reinforce complement, the present disclosure applies the bulkhead section composed of three parts. Therefore, it is possible to provide advantages such as a reduction in the number of parts, a reduction in weight, and a reduction in the number of assembly processes.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A device for reinforcing a vehicle body comprising a front side inner panel and a side outer reinforce complement assembled to the front side inner panel, the device comprising:
    a bulkhead section formed in a closed space between the front side inner panel and the side outer reinforce complement, wherein the front side inner panel and the side outer reinforce complement are cross-linked to each other by the bulkhead section.

2. The device of claim 1, wherein the bulkhead section comprises:
    a first bulkhead mounted on an outer surface of the front side inner panel; and
    a second bulkhead mounted on an inner surface of the side outer reinforce complement so as to be cross-linked to the first bulkhead.

3. The device of claim 2, wherein the first bulkhead has a "⊏" cross-sectional structure in which the first bulkhead has a plurality of cross-linking holes formed in a front portion thereof, and the second bulkhead is provided in the form of a square pillar inserted into the cross-linking holes of the first bulkhead.

4. The device of claim 2, wherein the first bulkhead has first mounting ends extending from its upper and lower edges, the first mounting ends being pressed against the outer surface of the front side inner panel.

5. The device of claim 4, wherein the first mounting ends are welded to the outer surface of the front side inner panel.

6. The device of claim 2, wherein the second bulkhead has second mounting ends extending from four edges, the second mounting ends being pressed against and welded to the inner surface of the side outer reinforce complement.

7. The device of claim 2, wherein the second bulkhead is provided in the form of a square pillar having a gradually decreasing cross-sectional area in an inward direction.

8. The device of claim 2, wherein the second bulkhead acts as a resistance element when the front side inner panel is deformed by an occurrence of collision in a state in which the second bulkhead is inserted into a cross-linking hole of the first bulkhead.

9. A vehicle body comprising:
 a front side inner panel;
 a side outer reinforce complement assembled to the front side inner panel; and
 a bulkhead section formed in a closed space between the front side inner panel and the side outer reinforce complement, wherein the front side inner panel and the side outer reinforce complement are cross-linked to each other by the bulkhead section.

10. The vehicle body of claim 9, wherein the bulkhead section comprises:
 a first bulkhead mounted on an outer surface of the front side inner panel; and
 a second bulkhead mounted on an inner surface of the side outer reinforce complement so as to be cross-linked to the first bulkhead.

11. The vehicle body of claim 10, wherein the first bulkhead has a "⊏" cross-sectional structure in which the first bulkhead has a plurality of cross-linking holes formed in a front portion thereof, and the second bulkhead is provided in the form of a square pillar inserted into the cross-linking holes of the first bulkhead.

12. The vehicle body of claim 10, wherein the first bulkhead has first mounting ends extending from its upper and lower edges, the first mounting ends being pressed against and welded to the outer surface of the front side inner panel.

13. The vehicle body of claim 10, wherein the second bulkhead has second mounting ends extending from four edges, the second mounting ends being pressed against and welded to the inner surface of the side outer reinforce complement.

14. The vehicle body of claim 10, wherein the second bulkhead is provided in the form of a square pillar having a gradually decreasing cross-sectional area in an inward direction.

15. The vehicle body of claim 10, wherein the second bulkhead acts as a resistance element when the front side inner panel is deformed by an occurrence of collision in a state in which the second bulkhead is inserted into a cross-linking hole of the first bulkhead.

16. A vehicle body comprising:
 a front side inner panel;
 a side outer reinforce complement assembled to the front side inner panel;
 a first bulkhead mounted on an outer surface of the front side inner panel; and
 a second bulkhead mounted on an inner surface of the side outer reinforce complement and cross-linked to the first bulkhead.

17. The vehicle body of claim 16, wherein the first bulkhead has a "⊏" cross-sectional structure in which the first bulkhead has a plurality of cross-linking holes formed in a front portion thereof, and the second bulkhead is provided in the form of a square pillar inserted into the cross-linking holes of the first bulkhead.

18. The vehicle body of claim 16, wherein the first bulkhead has first mounting ends extending from its upper and lower edges, the first mounting ends being pressed against and welded to the outer surface of the front side inner panel.

19. The vehicle body of claim 16, wherein the second bulkhead has second mounting ends extending from four edges, the second mounting ends being pressed against and welded to the inner surface of the side outer reinforce complement.

20. The vehicle body of claim 16, wherein the second bulkhead is provided in the form of a square pillar having a gradually decreasing cross-sectional area in an inward direction.

* * * * *